United States Patent
Lightcap, Jr.

(10) Patent No.: US 6,187,382 B1
(45) Date of Patent: Feb. 13, 2001

(54) LIQUID MEMBRANE-FORMING CURING COMPOSITION AND METHOD OF CURING FRESH CONCRETE

(76) Inventor: Donald V. Lightcap, Jr., 3404 State Rd. 101, Woodburn, IN (US) 46797

(*) Notice: Under 35 U.S.C. 154(b), the term of this patent shall be extended for 0 days.

(21) Appl. No.: 09/169,342

(22) Filed: Oct. 9, 1998

(51) Int. Cl.$^7$ .................................................. B05D 7/00
(52) U.S. Cl. ..................................... 427/384; 427/421
(58) Field of Search .................... 427/421, 384, 427/403

(56) References Cited

U.S. PATENT DOCUMENTS

| | | | |
|---|---|---|---|
| 3,228,777 | * | 1/1966 | Kubie ........................ 106/12 |
| 4,022,946 | * | 5/1977 | Cummings .................. 428/413 |
| 4,119,597 | * | 10/1978 | Enoue ........................ 260/23 R |
| 4,239,540 | * | 12/1980 | Hsin-Chu .................... 106/12 |
| 4,818,789 | * | 4/1989 | Tomko et al. ............... 525/64 |
| 5,100,697 | * | 3/1992 | Nielsen ....................... 427/133 |
| 5,792,552 | * | 8/1998 | Langkamp et al. ......... 428/309.9 |

OTHER PUBLICATIONS

Fats and Fatty Oils, Ullman's Encyclopedia of Industrial Chemistry, vol. A–10, pp. 191–200, 227–231, Jan. 1987.*

Collin et al., Resins, Synthetic, Ullman's Encyclopedia of Industrial Chemistry, vol. A–23, pp. 89–108, Jan. 1993.*

* cited by examiner

Primary Examiner—Shrive Beck
Assistant Examiner—Jennifer Calcagni
(74) Attorney, Agent, or Firm—Mark F. Smith; Smith, Guttag & Bolin

(57) ABSTRACT

An improved liquid membrane-forming curing composition and a method of curing fresh concrete. The curing composition is effective for providing a membrane layer over the exposed surfaces of fresh concrete for retaining the water of hydration therein for the proper curing of the concrete. In a preferred embodiment, the curing composition comprises a vegetable oil, preferably a non-refined vegetable oil such as coconut oil, corn oil, cottonseed oil, palm oil, rapeseed (canola) oil, soya oil, sunflower oil, and mixtures thereof; a surfactant effective for providing a stable oil-in-water emulsion, a drying agent, and water.

20 Claims, 1 Drawing Sheet

EXAMPLES (Weight Percents)

| | I | II | III | IV | V | VI | VII | VIII |
|---|---|---|---|---|---|---|---|---|
| Soya Oil | 48.00 | 45.60 | 45.60 | 48.00 | 38.00 | 48.00 | 37.62 | 48.00 |
| Methyl Soyate | | | | | 10.00 | | 9.90 | |
| Surfactant | | 5.00 | 5.00 | | | 2.00 | 2.97 | 4.00 |
| Calcium Sulfate | | 1.42 | | | | 1.40 | 1.39 | |
| Calcium Carbonate | | | 1.42 | | | | | |
| Calcium Hydroxide | 1.50 | | | 1.50 | | 0.10 | 0.10 | |
| Calcium Carboxylate | | | | | | | | 2.00 |
| Kaolin | | | | | 1.50 | | | |
| Water | 50.50 | 47.98 | 47.98 | 50.50 | 50.50 | 48.50 | 48.02 | 46.00 |
| Water Loss (kg/m2/72hrs) | 0.31 | 0.25 | 0.32 | 0.51 | 0.44 | 0.41 | 0.28 | 0.26 |

Fig. 1

EXAMPLES (Weight Percents)

|  | I | II | III | IV | V | VI | VII | VIII |
|---|---|---|---|---|---|---|---|---|
| Soya Oil | 48.00 | 45.60 | 45.60 | 48.00 | 38.00 | 48.00 | 37.62 | 48.00 |
| Methyl Soyate |  |  |  |  | 10.00 |  | 9.90 |  |
| Surfactant |  | 5.00 | 5.00 |  |  | 2.00 | 2.97 | 4.00 |
| Calcium Sulfate |  | 1.42 |  |  |  | 1.40 | 1.39 |  |
| Calcium Carbonate |  |  | 1.42 |  |  |  |  |  |
| Calcium Hydroxide | 1.50 |  |  |  | 1.50 | 0.10 | 0.10 |  |
| Calcium Carboxylate |  |  |  |  |  |  |  | 2.00 |
| Kaolin |  |  |  | 1.50 |  |  |  |  |
| Water | 50.50 | 47.98 | 47.98 | 50.50 | 50.50 | 48.50 | 48.02 | 46.00 |
| Water Loss (kg/m2/72hrs) | 0.31 | 0.25 | 0.32 | 0.51 | 0.44 | 0.41 | 0.28 | 0.26 |

LIQUID MEMBRANE-FORMING CURING COMPOSITION AND METHOD OF CURING FRESH CONCRETE

BACKGROUND OF THE INVENTION

This invention relates to a curing composition and method for curing fresh concrete and more particularly, to a water dispersible curing composition and a method for properly curing fresh concrete by providing a membrane layer over the exposed surfaces of the concrete to retain the water of hydration therein.

Fresh concrete used in the concrete industry for constructing and repairing pavements, highways, buildings, and the like are typically coated with a curing agent to retain the water of hydration within the concrete. In order for the fresh concrete to properly cure, sufficient water must be present in the concrete mix to hydrate the silicate and aluminate compounds that make up the cement. Either a deficiency or an excess of water in the concrete during the curing process will result in the concrete not achieving its necessary or desired strength and may even result in shrinkage, cracking, or the concrete having relatively low abrasion resistance. Therefore, formulations for making concrete normally includes only the water required for hydration thereby requiring the rate of water loss during the curing process to be kept at a minimum. Various materials, methods, and procedures for curing concrete have been developed but the principles involved are the same; to insure the maintenance of a satisfactory moisture content and temperature so that desired properties may develop. It has been found that a 27 day period of water retention is sufficient for proper curing of the concrete.

During the initial stages of curing, water evaporates at the exposed surfaces of the concrete. The two systems typically used for maintaining a satisfactory moisture content in fresh concrete are 1) the continuous or frequent application of water through ponding, sprays, steams, or saturated cover materials such as burlap, dirt, sand, straw, and the like; and 2) the use of materials such as sheets of plastic, or by the application of a membrane-forming curing composition over the exposed surfaces of the fresh concrete to reduce the rate of water loss from the concrete by evaporation.

There are several advantages in using liquid membrane-forming curing compositions that make their use preferable over other curing methods. For example, the moisture within the concrete is sealed in so there is less risk of excess drying due to failure to keep the surface wet. In addition, liquid membrane-forming curing compositions are typically easy to apply, are relatively inexpensive, and require little or no cleanup.

Accordingly, to be effective, liquid membrane-forming concrete curing compositions must operate such that the moisture content is maintained within the concrete during the curing period to allow the desired levels of concrete properties to develop and to reduce the risk of shrinkage, cracking, dusting, scaling, and crazing of the concrete. This can be chemically challenging due to the relatively high pH levels of the water of hydration that can typically range between a pH 11 to a pH 14. To ensure such effectiveness, the concrete industry has developed a standard specification known as the American Society for Testing and Material's Standard Specification For Liquid Membrane-Forming Compounds For Curing Concrete (ASTM C-309). According to ASTM C-309, an effective liquid membrane-forming curing composition should create a hydrophobic membrane over the surface of the concrete such that less than 0.55 kilograms of water escapes through a square meter of the concrete during a 72 hour period.

Various liquid member-forming concrete curing compositions have been developed which are effective for maintaining a satisfactory moisture content in freshly poured concrete. Such compositions include refined linseed oil diluted in mineral sprits (petroleum distillates), acrylic resins dissolved in mineral sprits, and hydrocarbon resins or slack waxes dissolved in mineral sprits.

Curing compositions containing mineral sprits, however, have been criticized since their use may result in the releasing of volatile organic compounds (VOC's) into the atmosphere, the production of objectionable orders, and the causing of skin or respiratory irritation to humans exposed to such curing compositions. The use of such curing compositions has also been criticized because of their general high degree of flammability and the potential for environmental problems caused by spillage, run off and overspray during application, their tendency to stain the concrete surface, and their use of non-renewable raw materials. To reduce the overall amount of VOC's being released into the atmosphere, such compositions are often emulsified into water. However, such emulsified compositions generally require the use of volatile distillates, alcohols, or other environmentally unfriendly solvents (VOC's), and can be flammable and a cause of skin and respiratory irritation to humans.

Compositions containing slack waxes, while relatively inexpensive, tend to lack consistency which may result in emulsion or dispersion instability as well as finished product and performance inconsistency.

Other compositions developed for use in the concrete industry operate to form heavy polymeric coatings over the surface of the concrete. Unfortunately, while such coatings are successful in retaining water of hydration within the curing concrete, they often cause adhesion problems for floor finishers after the 27 day curing period has passed. Accordingly, the removal of such polymeric coatings from the surface of the cured concrete is often necessary before a flooring adhesive or a finish can be applied. Further, pinholes in the polymeric coatings, such as an acrylic resin-based coating, can occur and cause localized curing performance failures.

Consequently, a need exists for a liquid curing composition for concrete which is effective for forming a hydrophobic membrane over the surface of the concrete and provides product and performance consistency, which is non-toxic, non-staining, not flammable, stable, ecologically acceptable, relatively inexpensive, and easily applied.

SUMMARY OF THE INVENTION

The present invention is directed to an improved liquid membrane-forming curing composition and a method of curing fresh concrete.

In a preferred embodiment of the invention, the curing composition comprises a vegetable oil, a drying agent; and water.

In another preferred embodiment of the invention, the curing composition further comprises a surfactant effective for providing a stable concentrate and oil-in-water emulsion.

In another preferred embodiment of the invention, the vegetable oil is a non-refined vegetable oil.

In another preferred embodiment of the invention, the vegetable oil is a refined vegetable oil.

In another preferred embodiment of the invention, the vegetable oil is a degummed vegetable oil.

In another preferred embodiment of the invention, the curing composition comprises esters produced from vegetable oils.

In another preferred embodiment of the invention, the curing composition comprises blown or self-polymerized vegetable oil.

In another preferred embodiment of the invention, the vegetable oil is selected from the group comprising soy, coconut, corn, sunflower, canola, cottonseed, palm oil, and a combination thereof.

In another preferred embodiment of the invention, the curing composition comprises one or more surfactants effective for providing dispersion of the vegetable oil (or derivative) in the water.

In another preferred embodiment of the invention, the surfactant is selected from the group comprising alkyl alkoxylates, aryl oxyalkylates, sulfonates, carboxylates, alkyl and aryl alcohols, glycols, and a composition thereof.

In another preferred embodiment of the invention the surfactant comprises an ethylene oxide reacted with nonylphenol.

In another preferred embodiment of the invention the surfactant comprises a 3 mole ethylene oxide adduct of C12 and C14 alcohols.

In another preferred embodiment of the invention, the drying agent is selected from the group comprising metal salts, metal carboxylates, metal sulfonates, and a combination thereof. In another preferred embodiment of the invention, the drying agent is selected from the group comprising alkali metal salts, alkali metal carboxylates, alkali metal sulfonates, and a combination thereof.

In another preferred embodiment of the invention, the drying agent comprises a clay.

In another preferred embodiment of the invention, the curing composition comprises a hydrophobic resin.

In another preferred embodiment of the invention, the hydrophobic resin comprises a hydrocarbon resin.

In another preferred embodiment of the invention, the hydrophobic resin comprises a poly aryl resin.

In another preferred embodiment of the invention, the curing composition is formed from a pre-emulsion concentrate that is stable and does not separate during storage.

In another preferred embodiment of the invention, a method of forming a liquid membrane-forming curing composition comprises the steps of mixing together a vegetable oil; a drying agent; and a surfactant to form a pre-emulsion concentrate; and mixing the pre-emulsion concentrate with water to form an oil-in-water emulsion.

In another preferred embodiment of the invention, the liquid membrane-forming curing composition is applied to the exposed surfaces of fresh concrete by hand, power sprayer, or by mechanical application.

A primary object of this invention, therefore, is to provide a curing composition for concrete that is effective for retaining water of hydration within fresh concrete.

Another primary object of this invention is to provide a curing composition for concrete that is effective for inhibiting or preventing excess water evaporation during curing.

Another primary object of this invention is to provide a curing composition for concrete that provides a membrane barrier which is effective for retaining water of hydration within fresh concrete for a period of at least 27 days.

Another primary object of this invention is to provide a curing composition for concrete that complies with ASTM C-309 specifications.

Another primary object of this invention is to provide a curing composition for concrete that does not result in discoloration of the concrete surface.

Another primary object of this invention is to provide a curing composition for concrete that is stable and does not separate during storage.

Another primary object of this invention is to provide a curing composition for concrete that is formed from a pre-emulsion concentrate which is stable and does not separate during storage.

Another primary object of this invention is to provide a curing composition for concrete that is non-toxic.

Another primary object of this invention is to provide a curing composition for concrete that is ecologically acceptable.

Another primary object of this invention is to provide a curing composition for concrete that is formed primarily from a renewable source.

Another primary object of this invention is to provide a curing composition for concrete that is relatively inexpensive.

Another primary object of this invention is to provide a curing composition for concrete that is easy to apply.

These and other objects and advantages of the invention will be apparent from the following description and the appended claims.

BRIEF DESCRIPTION OF THE DRAWING

FIG. 1 is a table showing examples of preferred embodiments of the liquid membrane-forming curing compositions of the present invention and the results of testing such compositions in accordance using the American Society for Testing and Material's Standard Test Method For Water Retention By Concrete Curing Materials (ASTM C-156).

DESCRIPTION OF THE PREFERRED EMBODIMENT

A preferred embodiment of the liquid membrane-forming curing composition for concrete of the present invention comprises an oil and water emulsion prepared from a preemulsion concentrate having a high concentration of a vegetable oil. Preferably, the oil comprises nonrefined (crude) soya oil, however, other suitable vegetable oils (or a vegetable oil derivative such as methyl soyate) include degummed, refined, and non-refined coconut oil, corn oil, cottonseed oil, palm oil, rapeseed (canola) oil, and sunflower oil. It should be apparent to one skilled in the art, however, that a curing composition for concrete comprising a nonrefined vegetable oil as a base component will be significantly less expensive than curing compositions for concrete that require refined petroleum or degummed or refined vegetable oils as a base component.

It has been found that a drying agent, such as metal salts, metal carboxylates, metal sulfonates, alkali metal salts, alkali metal carboxylates, alkali sulfonates, and clay, improves the characteristics of the composition by aiding in the removal of the water used to disperse the composition over the exposed surfaces of the fresh concrete and for curing the applied vegetable oil.

In the preferred embodiment, the pre-emulsion concentrate is prepared by mixing together a large amount of vegetable oil with a drying agent and a surfactant that is suitable for providing a stable composition. While surfactants suitable for use with refined vegetables oils are known, surfactants suitable for use with non-refined vegetable oils have not been used in the concrete industry for curing compositions due to the difficulty and expense of preparing a stable pre-emulsion concentrate. However, it has been found that alkyl, aryl or glycol propoxylate, butoxylate or sulfonate-based surfactants, particularly alkyl alkoxylates, aryl oxyalkylates, carboxylates, alkyl and aryl alcohols and glycol ethoxylates may be used in the present invention to facilitate the formation of a stable refined and non-refined vegetable oil pre-emulsion concentrates.

The curing compositions of the present invention are prepared by mixing about 80% to about 99% by weight of vegetable oil (or a vegetable oil derivative) with about 1% to about 20% by weight of a surfactant and a drying agent to form a stable pre-emulsion concentrate. The pre-emulsion concentrate may be stored until ready to use or shipped to the customer for further preparation and use. The pre-emulsion concentrate is then emulsified with water to form a curing composition comprising about 5.0 to about 95.0 percent of water, about 5.0 to about 60.0 percent vegetable oil (or vegetable oil derivative), about 1.0 to about 20.0 percent of surfactant, and about 0.1 to about 5.0 percent of a drying agent. It has been found that the water provides an effective means to disperse the composition over the exposed surfaces of the fresh concrete and lowers the viscosity of the pre-emulsion concentrate to ensure that it can be easily dispensed by using conventional brush, roll, or spray systems and to allow penetration of the composition into the pores of the concrete. In another preferred composition, the curing composition may also contain about 0.5 to about 15.0 percent of resinous material.

A surfactant, that has been found to be particularly effective for producing a stable pre-emulsion concentrate for use with degummed, refined, and non-refined vegetable oils and one that will not separate during conditions of long term storage comprises 6 moles of ethylene oxide reacted with nonylphenol. Such a surfactant is commercially available from BASF Corporation under the name ICONOL NP-6. Another surfactant which is effective for producing a stable pre-emulsion concentrate for use with degummed, refined, and non-refined vegetable oils and one that will not separate during conditions of long term storage comprises a 3 mole ethylene oxide adduct of C12 and C14 alcohols. In formulating the surfactant, about 30% to about 50% by weight of C12 alcohol is first mixed with about 50% to about 70% C14 alcohol. The C12 and C14 alcohols are then ethoxylated with 3 moles of ethylene oxide to produce the desired surfactant.

Drying agents that that has been found to be particularly effective for removing the water of the composition after it has been dispersed across the exposed surfaces of the fresh concrete and to aid in the curing of the vegetable oil include calcium sulfate, calcium carbonate, calcium hydroxide, calcium carboxylates, manganese carboxylates, and clay.

When applied to a fresh concrete surface, the liquid membrane-forming curing composition penetrates into the concrete, carrying the vegetable oil and drying agent into the pores and along the exposed surface of the concrete. As the water slowly evaporates, the oil and drying agent remain and fills the pores and forms a water resistant membrane along the concrete surface. The water resistant membrane acts to inhibit or prevent the evaporation of water out through the exposed concrete surfaces thereby maintaining a satisfactory moisture content for proper curing of the concrete.

In order to further illustrate the invention, the following specific examples of curing compositions for concrete were prepared:

EXAMPLE I

A curing composition for concrete was prepared by mixing together 384 grams of non-refined soya oil and 12.0 grams of calcium hydroxide with 404.0 grams of water, at ambient temperature using a high speed blender at 3000 rpm for 5 minutes, to form the desired composition. The formed composition was found not to be a stable dispersion.

EXAMPLE II

A curing composition for concrete was prepared by mixing together a 364.8 grams of non-refined soya oil with 40.0 grams of a surfactant comprising a 6 moles ethylene oxide reacted with nonylphenol, and 11.4 grams of calcium sulfate to produce the desired pre-emulsion concentrate. The pre-emulsion concentrate was then blended into 383.8 grams of water at ambient temperature using a high speed blender at 3000 rpm for 5 minutes to produce the desired composition. The formed composition was found to be a stable dispersion.

EXAMPLE III

A curing composition for concrete was prepared by mixing together a 364.8 grams of non-refined soya oil with 40.0 grams of a surfactant comprising a 6 moles of ethylene oxide reacted with nonylphenol, and 11.4 grams of calcium carbonate to produce the desired pre-emulsion concentrate. The pre-emulsion concentrate was then blended into 383.8 grams of water at ambient temperature using a high speed blender at 3000 rpm for 5 minutes to produce the desired composition. The formed composition was found to be a stable dispersion.

EXAMPLE IV

A curing composition for concrete was prepared by mixing together a 384.0 grams of non-refined soya oil with 12.0 grams of kaolin (clay) and blended into 404.0 grams of water at ambient temperature using a high speed blender at 3000 rpm for 5 minutes to produce the desired composition. The formed composition was found not to be a stable dispersion.

EXAMPLE V

A curing composition for concrete was prepared by mixing together a 304.0 grams of non-refined soya oil with 80.0 grams of methyl soyate and 12.0 grams of calcium hydroxide and blended into 404.0 grams of water at ambient temperature using a high speed blender at 3000 rpm for 5 minutes to produce the desired composition. The formed composition was found not to be a stable dispersion.

EXAMPLE VI

A curing composition for concrete was prepared by mixing together a 384.0 grams of non-refined soya oil with 16.0 grams of a surfactant comprising 6 moles of ethylene oxide reacted with nonylphenol, and 0.8 grams of calcium hydroxide, and 11.2 grams of calcium sulfate to produce the desired pre-emulsion concentrate. The pre-emulsion concentrate was then blended into 388.0 grams of water at ambient temperature using a high speed blender at 3000 rpm for 5 minutes to produce the desired composition. The formed composition was found to be a stable dispersion.

EXAMPLE VII

A curing composition for concrete was prepared by mixing together a 304.0 grams of non-refined soya oil with 80.0 grams of methyl soyate, 24.0 grams of a surfactant comprising 6 moles of ethylene oxide reacted with nonylphenol, and 0.8 grams of calcium hydroxide, and 11.2 grams of calcium sulfate to produce the desired pre-emulsion concentrate. The pre-emulsion concentrate was then blended into 388.0 grams of water at ambient temperature using a high speed blender at 3000 rpm for 5 minutes to produce the desired composition. The formed composition was found to be a stable dispersion.

EXAMPLE VIII

A curing composition for concrete was prepared by mixing together a 384.0 grams of non-refined soya oil with 32.0 grams of a surfactant comprising a 6 moles of ethylene oxide reacted with nonylphenol, and 16.0 grams of calcium carboxylate to produce the desired pre-emulsion concentrate. The pre-emulsion concentrate was then blended into 368.0 grams of water at ambient temperature using a high speed blender at 3000 rpm for 5 minutes to produce the desired composition. The formed composition was found to be a stable dispersion.

The example compositions were each applied to a fresh concrete surface and tested in accordance with the American Society for Testing and Material's Standard Test Method For Water Retention By Concrete Curing Materials (ASTM C-156). A summary of the results of such testing are shown in FIG. 1. According to ASTM C-309 specification, an effective liquid membrane-forming curing composition should create a hydrophobic membrane over the surface of the concrete such that less than 0.55 kilograms of water escapes through a square meter of the concrete during a 72 hour period. As shown, all of the example liquid membrane-forming concrete curing compositions of the present invention complied with the water retention properties required under ASTM C-309 specification.

It has also been found that the curing composition of the present invention may include hydrophobic resins, such as hydrocarbon resin and poly aryl resin that will further reduce the rate of evaporation of the water of hydration out through the exposed surface of the fresh concrete.

Accordingly, the liquid membrane-forming curing composition of the present invention is effective for preventing excessive loss of water from fresh concrete by evaporation thereby insuring the maintenance of a satisfactory moisture content necessary for the proper curing of the concrete. Further, the concrete curing composition of the present invention does not result in discoloration of the concrete surface, is stable and does not separate during storage, is non-toxic, ecologically acceptable, relatively inexpensive, and may be easily applied to the surface of freshly laid pavement, highways, buildings and the like by means such as brushing, rolling or spraying.

While the composition herein described constitutes a preferred embodiment of this invention, it is to be understood that variations may be made therein without departing from the scope of the invention which is defined in the appended claims.

What is claimed is:

1. A method of curing fresh concrete comprising the steps of:
preparing a pre-emulsion concentrate comprising a vegetable oil, a drying agent, and a surfactant to form a pre-emulsion concentrate;
mixing the pre-emulsion concentrate with water to form a curing composition; and
applying the curing composition to the exposed surfaces of the fresh concrete;
wherein said curing composition comprises about 5.0 to about 95 percent water, about 5.0 to 60.0 percent vegetable oil, about 1.0 to about 20.0 percent of surfactant, and about 0.1 to about 5.0 percent of a drying agent.

2. The method of curing fresh concrete of claim 1 wherein said drying agent is selected from the group consisting of metal salts, metal carboxylates, metal sulfonates; and a combination thereof.

3. The method of curing fresh concrete of claim 1 wherein said drying agent is selected from the group consisting of alkali metal salts, alkali metal carboxylates, alkali metal sulfonates; and a combination thereof.

4. The method of curing fresh concrete of claim 1 wherein said drying agent is selected from the group consisting of clay.

5. The method of curing fresh concrete of claim 1 wherein said drying agent is from the group consisting of calcium sulfate, calcium carbonate, calcium hydroxide, calcium carboxylates, manganese carboxylates; and a combination thereof.

6. The method of curing fresh concrete of claim 2 wherein said vegetable oil is a non-refined vegetable oil.

7. The curing composition of claim 2 wherein said vegetable oil is a degummed vegetable oil.

8. The curing composition of claim 2 wherein said vegetable oil is a refined vegetable oil.

9. The method of curing fresh concrete of claim 2 wherein said vegetable oil is a self-polymerized vegetable oil.

10. The method of curing fresh concrete of claim 2 wherein said vegetable oil is selected from the group consisting of soy oil, coconut oil, corn oil, cottonseed oil, palm oil, rapeseed (canola) oil, sunflower oil, and a combination thereof.

11. The method of curing fresh concrete of claim 2 wherein said vegetable oil is a non-refined soya oil.

12. The method of curing fresh concrete of claim 2 wherein said surfactant is selected from the group comprising of alkyl, aryl and glycol ethoxylate, propoxylate, butoxylate, and sulfonate based surfactants.

13. The method of curing fresh concrete of claim 2 wherein said surfactant comprises an ethylene oxide reacted with nonylphenol.

14. The method of curing fresh concrete of claim 2 wherein said surfactant comprises a 3 mole ethylene oxide adduct of C12 and C14 alcohols.

15. The method of curing fresh concrete of claim 2 wherein said curing composition further comprises a hydrophobic resin.

16. The method of curing fresh concrete of claim 2 wherein said curing composition further comprises a hydrocarbon resin.

17. The method of curing fresh concrete of claim 2 wherein said curing composition further comprises a poly aryl resin.

18. The method of curing fresh concrete of claim 2 wherein the curing composition is applied to the exposed surfaces of fresh concrete by hand, power sprayer, or by mechanical application.

19. The method of curing fresh concrete of claim 1 wherein said pre-emulsion concentrate comprises about 80% to about 90% by weight of vegetable oil.

20. The method of curing fresh concrete of claim 1 further comprising the steps of:
mixing about 30 percent to about 50 percent by weight of C12 alcohol with about 50 percent to about 70 percent C14; and
ethoxylate said C12 and C14 alcohols with 3 moles of ethylene oxide to produce said surfactant.

* * * * *